United States Patent Office 2,830,873
Patented Apr. 15, 1958

2,830,873

FLUORIDE VOLATILITY PROCESS FOR THE RECOVERY OF URANIUM

Joseph J. Katz and Herbert H. Hyman, Chicago, and Irving Sheft, Oak Park, Ill., assignors to the United States of America as represented by the United States Atomic Energy Commission No Drawing. Application May 10, 1956
Serial No. 584,153

25 Claims. (Cl. 23—14.5)

The present invention is concerned with the separation and recovery of uranium from contaminants by a halogenation and volatilization method. The invention is particularly concerned with the recovery of uranium from contaminants arising from the neutron irradiation of uranium.

At the present time nearly all nuclear reactors employ uranium in one form or another as the primary fuel. The employment of uranium as a nuclear fuel in reactors has produced a great need for efficient methods for separating uranium from contaminants. The uranium used in reactors must be very pure. Therefore it must be separated from contaminants native to uranium ores as well as those introduced in processing the ores. After the uranium is neutron-irradiated in a reactor for a period of time, it must be separated from the nuclear reaction products. These include the fission products which are the elements having atomic numbers 32 to 64, inclusive, and if the isotope $U^{238}$ is present, it will also include the higher actinide elements such as neptunium and plutonium. There are also various additional uranium mixtures from which it is desirable to recover purified uranium. For example, a great deal of neutron-irradiated uranium has been processed to remove the plutonium from the uranium without removing the fission products from the uranium. Therefore it is now desirable to separate and recover uranium from this partially processed uranium containing the fission products and various chemicals which were added during the plutonium removal process.

There are several factors which make the recovery of uranium from neutron-irradiated uranium a particularly difficult problem. The normal starting material for a separation process for the recovery of uranium from neutron-irradiated uranium is a metal uranium slug which has been irradiated in a neutronic reactor for a sufficient time to produce fission products and plutonium. These fission products and plutonium are normally present in about 1 part fission products and 1 part plutonium per 1000 parts uranium. A successful separation process must separate the uranium from the fission products and plutonium so that the recovered uranium has not more than 1 part of fission products in $10^9$ parts of uranium and not more than 1 part of plutonium in $10^8$ parts of uranium. There are two main factors which complicate recovery processes. First, these fission products are exceedingly radioactive, so that any recovery process must be capable of being carried out by remote control. Second, plutonium and uranium are members of the actinide rare earth family and, although they do not have identical characteristics, the chemical characteristics are sufficiently close that it does increase the difficulty of separation of these two elements by chemical methods.

An ideal separation process for the recovery of uranium from neutron-irradiated uranium would include the following characteristics. The process should be one capable of continuous operation. The process must be one which can be operated by remote control because of the radiation hazards involved. Furthermore, it is desirable that the non-radioactive uranium be separated in an early step of the process from the radioactive fission products, so that the further processing of uranium may be carried on without the shielding required for processing radioactive materials. The efficiency of the separation of the uranium from the plutonium and fission products must be very good. If complete separation of uranium, plutonium and fission products is not achieved in a single continuous process, it is desirable that the fractions containing the plutonium and/or fission products should be in as small bulk as possible. Thus a plutonium fraction or a fission product fraction having a large bulk of materials added during the processing is undesirable. It is desirable that the uranium fraction be obtained as the metal or in the form of a compound such as uranium hexafluoride which can be readily converted to the metal. Uranium hexafluoride also may be used directly as the feed material in isotopic separation processes.

It is an object of the present invention to provide a volatilization method of separating uranium from contaminants.

It is an additional object of the present invention to provide a method of recovering purified uranium from neutron-irradiated uranium.

Other objects of the present invention will be apparent from the description which follows.

In accordance with the present invention uranium contaminated with other elements, for example the radioactive fission products, may be conveniently recovered from such contaminants by a process the initial step of which comprises dissolving said contaminated uranium in a halogen fluoride in the liquid phase. This dissolution step effects a partial phase separation of the uranium and certain contaminants. The uranium is converted to the halogen fluoride-soluble uranium hexafluoride compound whereas the fluorides of certain contaminating elements are insoluble in liquid halogen fluorides and the reaction rate of halogen fluorides with certain other solid uranium contaminants is sufficiently slower than the reaction rate with uranium that substantial portions of these contaminating elements will remain as solids in the liquid phase halogen fluoride. These foregoing solids are then separated from the solution by a distillation step, or other convenient method of separating solids from liquid, such as filtration, centrifugation, etc. The uranium hexafluoride ($UF_6$) is then separated from the balance of the impurities and solvent by one or more distillation steps.

as will be more fully described in the following paragraphs.

The use of the halogen fluorides as fluorinating agents in the liquid phase provides several advantages over the use of fluorine. A liquid phase fluorination greatly reduces the corrosion of equipment that is found with gaseous fluorination. Furthermore, the health hazard in the fluorination of radioactive fission products or materials containing fission products by gaseous fluorinating agents is greatly reduced by the fluorination in the liquid phase. The halogen fluorides are extremely reactive with water so that every precaution must be taken in the process to avoid bringing the halogen fluorides in contact with any aqueous phase. The materials of construction for reactors also must be selected with some care. It has been found, however, that such common metals as iron, nickel, aluminum and copper readily form coherent protective films in the presence of halogen fluorides which make their use as construction materials for handling the liquid halogen fluorides practical. Of these construction materials nickel and high nickel alloys appear to be least affected by halogen fluorides and accordingly are favored for reactor construction. Aluminum, however, is nearly as satisfactory from the corrosion standpoint, and much less expensive for use in reactor construction.

While the process of the present invention is particularly adapted to the recovery of uranium from contaminated uranium metallic masses, it may also be used to recover uranium from contaminated uranium contained in other forms. Thus, any uranium salt or salt mass may be dissolved by the present process by a suitable adjustment of reaction temperature and pressure. The present process is particularly applicable to the recovery of purified uranium from the uranium wastes which are by-products of the recovery of plutonium from uranium by precipitation processes. These wastes are usually primarily in the form of uranium salts such as uranyl ammonium phosphate containing 200–600 parts per million of radioactive fission products with respect to uranium content. The process is, of course, equally applicable to the recovery of any uranium isotope or combination of isotopes.

The halogen fluorides which can be used as dissolving agents in the present process include various fluorides which are liquid at or about room temperature. Chlorine trifluoride, which has a boiling point of 11.8° C., may be used in the present process. The chlorine trifluoride may be maintained in the liquid state by suitable adjustment of temperature and pressure of the reactor. The other halogen fluorides which are included within the scope of dissolving agents for this invention include bromine monofluoride, bromine trifluoride, bromine pentafluoride, and iodine pentafluoride. There are several factors, such as cost, stability, reactiveness, availablity, etc., which enter into the choice of a particular halogen fluoride agent to be used under specific circumstances. On the basis of these and other factors, chlorine trifluoride, bromine trifluoride, and bromine pentafluoride have been found to be the most satisfactory halogen fluorides for use in the present process. Of these three, bromine trifluoride has been found to be most suitable for the recovery of uranium from neutron-irradiated uranium metal, chiefly because of its greater reactivity.

The reactivity of the halogen fluoride liquids apparently depends upon self-ionization. This self-ionization tends to proceed in each of the halogen fluorides via the simultaneous gain and loss of a fluorine nucleus and the attached electron pair. That is to say, every compound in the system may be regarded as a fluoride ion donor or acceptor (and usually both). The concentration of fluoride system cations such as $Br^+$ and $BrF^+$ in bromine trifluoride solutions is apparently a very important factor in the reactivity of these solutions towards other materials such as uranium. Some measure of the reactivity may be correlated with the conductivity of the halogen fluorides. The order of the conductivity of various halogen fluorides is as follows:

TABLE I

| Compound | Conductivity at 25° C. (ohm$^{-1}$ cm.$^{-1}$) |
|---|---|
| $BrF_3$ | $8.0 \times 10^{-3}$ |
| $IF_5$ | $2.3 \times 10^{-5}$ |
| $BrF_5$ | $8.4 \times 10^{-7}$ |
| $ClF_3$ | $3 \times 10^{-9}$ (at 0° C.) |

The reactivity of the halogen fluorides toward uranium masses is in substantially the same order. However, it must again be emphasized that by suitably increasing the temperature and pressure of the reactor in which distillation is carried out any of these halogen fluorides will dissolve uranium masses.

One aspect of the present invention is concerned with a method of increasing the rate of dissolution of uranium and similar metals by the halogen fluorides, such as bromine trifluoride. It has been found that the rate of dissolution of uranium metal in pure bromine trifluoride is very slow at room temperature. It is believed that this is probably due to the absence of the bromine trifluoride system cations which are believed to be the prime cause of the attack on the metal. However, where uranium is maintained in contact with bromine trifluoride for a substantial period of time, it is found that the slow initial rate of reaction will be followed after a period by a much faster rate of reaction between the uranium and bromine trifluoride. This may be due to the accumulation of a substantial amount of bromine trifluoride system cations in the solution as a result of the formation of bromine and bromine fluoride in the initial, or "incubation" stage of the reaction. It has been found in the course of this invention that the rate of reaction of bromine trifluoride can be greatly increased over that of the pure bromine trifluoride by the addition of a material to the bromine trifluoride solvent which will produce bromine trifluoride system cations in the solvent. Thus, the addition of, for example, approximately 10 mole percent bromine to a bromine trifluoride solution will result in the formation of a fluoride solvent which has a greatly increased reactivity toward uranium. While greater or lesser amounts of bromine may be added to the bromine trifluoride, it has been found that the addition of more than 10 mole percent of bromine does not increase the reactivity rate over that obtained with a 10 mole percent bromine trifluoride solution and that this is about the optimum concentration.

The addition of halogen fluoride system acids to the bromine trifluoride solvent will also cause the production of cations in the solvent. A halogen fluoride system acid may be defined as a compound that is a good fluoride ion acceptor. Thus, antimony pentafluoride, when added to bromine trifluoride, will greatly improve the reaction rate of the bromine trifluoride solvent toward uranium. Other fluorine system acids, such as niobium pentafluoride and tin tetrafluoride, may also be used to increase the cation concentration of the solvent.

The increase in reactivity of halogen fluoride solvents with uranium, attained by the addition of a substance capable of producing fluoride system cations in the system to the halogen fluoride solvent, is further illustrated by the following examples tabulated in Table II. In these examples masses of metallic uranium of the specified weight were reacted with various solvents under substantially similar conditions of temperature and pressure. The comparative rates of penetration and dissolving times are shown.

TABLE II

| Dissolving mixture (g.) | Uranium Dissolved (g.) | Penetration (mm./hr.) | Incubation Time (hrs.) | Dissolution after Incubation (hrs.) | Total Dissolution Time (hrs.) |
|---|---|---|---|---|---|
| 37 g. of BrF₃ | 7.11 | 1.3 | 2.5 | 2.0 | 4.5 |
| 44 g. of BrF₃, 9.4 g. of Br₂ | 7.05 | 1.4 | <.1 | 1.6 | 1.6 |
| 8.2 g. of BrF₃, 37.5 g. of Br₂ | 7.04 | 2.7 | <.1 | 0.9 | 0.9 |
| 34 g. of BrF₃, 4 g. of SbF₅ | 7.05 | 12.2 | <0.1 | 0.2 | 0.2+ |

A particular embodiment of the present invention is concerned with the recovery of uranium from uranium masses containing other actinide elements such as plutonium. Of particular interest is the recovery of uranium from neutron-irradiated uranium metal slugs containing plutonium and fission products. It has been found that the dissolution of uranium masses in accordance with the foregoing methods results in the production of the uranium fluoride species, uranium hexafluoride. It has also been found that the foregoing methods of dissolution of uranium masses containing plutonium result in the production of the nonvolatile lower plutonium fluorides, plutonium tetrafluoride and/or plutonium trifluoride predominantly, but that a portion of the volatile plutonium fluoride, plutonium hexafluoride, is also produced. Plutonium hexafluoride is a volatile compound having a melting point of 50.7° C. and a boiling point of 62.3° C. Thus it will be seen that plutonium hexafluoride has virtually the same volatility as uranium hexafluoride which has a sublimation point of 56.4° C. Accordingly, recovery of pure uranium hexafluoride from uranium hexafluoride contaminated with any substantial amount of plutonium hexafluoride would be very difficult by distillation methods.

It is an object of this modification of the present invention to provide a method of dissolving uranium material containing plutonium in a halogen fluoride solution without forming any substantial amount of a volatile plutonium fluoride compound.

In accordance with the present invention, it has been found that uranium material containing plutonium may be dissolved in a halogen fluoride, and particularly bromine trifluoride, with the formation of a minimal amount of a volatile plutonium fluoride if the by-products of the reaction, and particularly bromine and bromine monofluoride, are continuously removed from the reactor zone during the dissolution step. The bromine and bromine monofluoride reaction products can be removed from the reaction zone by reacting them in the reaction zone with a suitable reactant, such as fluorine. Alternatively, they can be distilled from the reaction zone continuously, thus effectively removing them from the reaction zone. The bromine and bromine monofluoride form fluoride system cations in the bromine trifluoride solvent, and it is believed that it is these cations predominantly which react with the plutonium to form plutonium hexafluoride. The limitation of these fluoride system cations in the reaction zone will have a tendency to decrease the rate of dissolution of the uranium. This decrease in rate of reaction, however, may be compensated for by increasing the reaction zone temperature. It is desirable to carry out the dissolution step of this modification at a temperature of between approximately 100 and 160° C., and preferably about 130° C., in order to achieve a suitable uranium dissolution rate.

The very considerable decrease in the production of volatile plutonium fluorides obtained by employing the process of this modification of the present invention is demonstrated in the examples tabulated in Table III. In these examples pieces of plutonium wire were reacted with various halogen fluoride solvents. The constitution of the solvents and the conditions of the dissolutions are shown in the table. Upon completion of the reaction the volatile material was separated from the residue and the volatile material analyzed for plutonium. The results are shown in the table.

TABLE III

| Net Pu (mg.) | Time (hrs.) | Temp. (° C.) | BrF₃ (Mole Percent) | Other (Mole Percent) | Volatile Pu (Percent) |
|---|---|---|---|---|---|
| 9.0 | 4 | 60 | | 100 ClF₃ | 0.00 |
| 9.0 | 2 | 120 | | 100 BrF₅ | 0.00 |
| 7.1 | 22 | 90 | 100 | | 0.012 |
| 9.8 | 72 | 135 | 90 | 10 Br₂ | 0.23 |
| 1.0 | 0.25 | 90 | 100 | | {<0.1 / >0.00} |
| 8.8 | 16 | 100 | 90 | 10 Br₂ | 4.0 |
| 8.8 | 24 | 90 | 87 | 13 SbF₅ | 4.0 |

The method which has been found most suitable for removing excess bromine and bromine monofluoride during the dissolution of uranium metal containing plutonium comprises the addition of fluorine during the reaction. The fluorine reacts with the bromine and bromine fluoride to form bromine trifluoride, thus limiting the concentration of these substances in the reaction zone, and incidentally regenerating the bromine trifluoride used. Since these reactions take place substantially quantitatively, the net reaction of the dissolving step is substantially $$U + 3F_2 \rightarrow UF_6$$

Other regenerants than fluorine may be used. For example, bromine pentafluoride reacts at higher temperatures of the order of 150° C. with bromine and bromine fluoride to produce bromine trifluoride. A chlorine trifluoride regenerant is another alternative.

An alternative method of limiting the bromine and bromine fluoride in the reaction zone during the dissolution of uranium contaminated with plutonium comprises the removal of these products by distillation or similar methods. For example, a distillation tower can be added to the dissolver with a constant takeoff of the light end to a separate receiver. Since the bromine and bromine monofluoride have much lower boiling points than uranium hexafluoride these will distill off without loss of the uranium hexafluoride. Another method would be by means of an inert gas sparge of the dissolution zone followed by a scrubbing tower to remove the volatile components of the sparge. In either method the final condensate could be treated with fluorine, bromine pentafluoride or chlorine trifluoride to regenerate the bromine trifluoride for further use in the dissolver.

The choice of dissolution step of the process of the present invention depends upon whether plutonium is present in the uranium mass as has been pointed out. The subsequent steps of the process, however, are the same, whichever dissolution step is used.

If neutron-irradiated uranium is the starting material, the plutonium and a substantial portion of the fission products present may be separated from the uranium during the process of the dissolution step. Certain of the fission products, such as zirconium and cerium, have very slow reaction rates with bromine trifluoride, so that these fission products and contaminants may not be converted to the fluoride form during the dissolution step. Other fission products and contaminants, such as the alkali metal, cesium, and the alkaline earth, barium, form extremely nonvolatile fluorides. Still other contaminants, such as lanthanum and the other rare earths, form fluorides nonvolatile and also insoluble in bromine trifluoride. Fission products of these types may therefore be readily separated from uranium by dissolving the uranium in a halogen fluoride such as bromine trifluoride and then distilling the volatile components of the dissolution mixture from the dissolving chamber. The distillate from this step will comprise the halogen fluoride dissolving agent and all fluorides which are more volatile than the halogen fluoride. It is therefore preferable that the halogen fluoride be one which is less volatile than uranium hexafluoride, such as bromine trifluoride. This halogen fluoride will then remain as a solvent (or suspending agent) for plutonium and fission product fluorides when the uranium hexafluoride is removed. This makes possible the use of a continuous fractionation process for the distillation separation of uranium hexafluoride. If a solvent more volatile than uranium hexafluoride is employed, the uranium hexafluoride must be removed from a batch still, which is necessarily of fairly large capacity to accommodate the large volume of uranium hexafluoride processed, but which retains as a bottom residue only the small amount of plutonium and fission products deposited thereon. The plutonium and fission products have been found to deposit on the surface of the reactor vessel requiring a separate step to remove them which to some extent interferes with the continuity of the uranium distillation operations. For this reason, bromine trifluoride is the halogen fluoride which is preferred as the distillation reagent in the treatment of neutron-irradiated uranium.

The dissolution may be operated as a continuous dissolution process with the volatile materials being distilled therefrom. In this case, there should be a limited surface to the dissolver and a provision for bottom takeoff of the insolubles in a slurry of the solvent. Alternatively, the dissolution may be operated as a batch step. In this case, a container in the dissolver such as an aluminum capsule could be used as a container for the plutonium and nonvolatile and insoluble fission products. Another alternative is a fluoride carrier for plutonium which can be included in the dissolving medium. Aluminum fluoride which is insoluble in bromine trifluoride is a satisfactory reagent. The aluminum fluoride presents a large surface for the adsorption thereon of the plutonium and the slurry of the aluminum fluoride containing adsorbed plutonium could be readily removed from the dissolver vessel and then dissolved in aqueous medium for further processing. In a concentration process for the concentration of the plutonium the plutonium fluoride could also be removed from the surface of a dissolver vessel by an aqueous wash and the plutonium then concentrated from the wash.

Following the separation of the volatile fluorides from the nonvolatile fluorides and other residue the next step in the present process can comprise the separation of the fission product fluorides which are more volatile than uranium hexafluoride from a heavy fraction comprising uranium hexafluoride, the bromine trifluoride solvent, and fission product fluorides which are less volatile than uranium hexafluoride. The volatile fission product fluorides are those shown in the following table.

TABLE IV

*Volatile fission product fluorides*

| | Boiling Point (or Subl. Pt.) (° C.) | Melting Point (° C.) |
| --- | --- | --- |
| $AsF_5$ | −53.2 | −79.8 |
| $TeF_6$ | −38.3 | −37.8 |
| $MoF_6$ | 35.0 | 17.5 |
| $UF_6$ | 56.4 | 64.02* (T. P.) |
| $AsF_3$ | 58.0 | −6.0 |
| $IF_5$ | 97.0 | 8.5 |
| $NbF_5$ | 233.3 | 78.9 |
| $RuF_5$ | 313.0 | 106.0 |
| $TeF_4$ | 371.3 (Dec.~194° C.) | 129.6 |

*Triple point.

The only fission product fluoride more volatile than uranium hexafluoride which is present in substantial amounts in the solution of uranium hexafluoride after the cooling time necessary to permit the radioactive decay of short-lived fission products has elapsed is tellurium hexafluoride. The distillation of the light fraction from the uranium fluoride heavy fraction may be carried out either in a batch still or in a continuous-process still. The still should be operated at such a temperature and pressure that a solid uranium hexafluoride phase is not formed in the still. It is desirable that the very volatile fission product fluorides such as tellurium hexafluoride be taken off from the still overhead. The uranium hexafluoride should be maintained in the still bottoms as a liquid, either by means of pressure during the distillation or dissolved in a suitable solvent, such as bromine trifluoride, less volatile than uranium hexafluoride. A buffer zone may be formed between the major constituents, the light elements at the top of the still and the heavy elements at the bottom of the still. Hydrogen fluoride and bromine pentafluoride are suitable buffer zone constituents. These constituents are likely to be present as a result of the dissolution step operation, but additional amounts of these may be added if desired. When a batch still operating at atmospheric pressure is used, the uranium hexafluoride cannot be separated from the more volatile constituents if a liquid phase must be maintained at all times. Therefore, if a moderate pressure still is employed, chlorine trifluoride may be added to the solution to provide a considerable forerun of volatile material while remaining volatile impurities act as a solvent for the refluxing uranium hexafluoride when the still head is below the triple point of uranium hexafluoride (64.02° C. at 1137 mm. Hg).

Following the separation of the light fraction, the final step of the uranium recovery process comprises a distillation step to separate uranium hexafluoride from the solvent and the less volatile fission product fluorides. In this step the residue from the light fraction still is again distilled and the volatile uranium hexafluoride thus separated from the less volatile fission product fluorides and the bromine trifluoride solvent. Conventional type distillation apparatus may be used. Contrary to what might be expected from normal distillation experience in view of the fairly close ranges of some of the fission products, substantially complete decontamination from the less volatile products is obtained in this step. This is probably attributable to the fact that many of the fission product species form complexes with the bromine trifluoride solvent which are retained in the nonvolatile phase during the distillation step.

The bromine and bromine monofluoride side products of the reaction may be regenerated to bromine trifluoride by contacting these products with fluorine. Similarly, the bromine pentafluoride may be reacted with bromine at 150° C. to regenerate bromine trifluoride. The excess bromine trifluoride and regenerated bromine trifluoride may then be recycled into the process. Should it for any reason be undesirable to recycle the halogen halide into the process, the excess halogen halide may be contacted with a gaseous hydrogen halide such as hydrogen bromide or hydrochloric acid to form water-soluble products. For example, when bromine trifluoride is treated with gaseous hydrochloric acid, the products are hydrofluoric acid, bromine and chlorine, all of which are water-soluble. These water-soluble products may then be treated with water to form solutions thereof. The smooth, nonviolent reaction of these products with water is in sharp contrast with the violent reaction of water with the halogen halides.

Now that the process has been described, it may be further illustrated by the following examples. In Example I is described a laboratory-scale test of the process in which small-scale batch equipment was employed.

With laboratory equipment it is, of course, impractical to obtain both high yields and high decontamination factors. However, the examples does illustrate the applicability of the process to large-scale work.

EXAMPLE I

A 109 gram slice of a uranium slug which had been irradiated in a nuclear reactor for 84 days and then cooled for 70 days was contacted with 806 grams of $BrF_3$. The dissolver vessel, which was made of prefluorinated nickel, was maintained at approximately 135° C. 66 grams of fluorine was added to the reactor by bubbling it through the reaction mixture over the four-hour period which it took to dissolve the uranium slice. The radioactive fission products contained in the slice amounted to a total of $1.1 \times 10^6$ millivolts of gamma activity and $2 \times 10^{10}$ counts per minute of beta activity. The gamma activity was measured with a high-pressure ionization chamber and vibrating reed electrometer. This instrument had been calibrated against a standard cobalt source and it was found that one rutherford ($10^6$ disintegrations/sec.) of $Co^{60}$ activity (2 gammas/disintegration at 1.2 million electron volts) equaled 410 millivolts. The predominant beta-emitters were tellurium, $2 \times 10^8$ counts/min.; ruthenium, $2.5 \times 10^9$ counts/min.; and zirconium, $2.3 \times 10^9$ counts/min. The dissolver solution, upon completion of the dissolution step, was distilled through a first column and a fraction collected containing $UF_6$ and $BrF_5$. Additional $BrF_5$ was added to this cut and the mixture distilled through a second column. The final cut actually contained an appreciable amount of $BrF_5$. It was found, however, that even with this laboratory technique decontamination factors of $10^5$ for gamma and $10^4$ for beta were obtained by the two distillation steps. The decontamination factor is defined as the ratio of impurity present per unit weight before processing to that in the final product.

The following example illustrates application of the present process as a batch operation upon a pilot plant scale, namely, 10 kilograms of neutron-irradiated uranium as the initial feed.

EXAMPLE II

Forty-two moles (10 kilograms) of neutron-irradiated uranium was introduced into a dissolver containing 420 moles (57.6 kilograms) of $BrF_3$. The dissolver was operated at 130° C. and the pressure rose as high as 3000 mm. Hg during the dissolution. During the course of the dissolution, 126 moles (4.79 kilograms) of fluorine gas was bubbled through the dissolver liquid. Upon completion of the dissolution of the neutron-irradiated uranium a first distillation was made of the more volatile products of the dissolution step. The distillate from the first distillation comprised approximately 50 moles of $BrF_5$ (8.75 kg.). 50 moles (17.6 kg.) of $UF_6$, 50 moles (6.85 kg.) of $BrF_3$, and substantially all of the volatile fission products although negligible amounts by weight. A second cut was then taken from the dissolver by distillation, comprising 420 moles (57.6 kg.) of $BrF_3$ and 4 moles (1.4 kg.) of $UF_6$. This was recycled for use in subsequent dissolution cycles. The nonvolatile residues from the dissolver, comprising insoluble fission product fluorides, approximately 7 grams, and $PuF_3$, approximately 7 grams, were removed from the dissolver with an aqueous wash. The first distillate fraction taken from the dissolver was introduced into a light-fraction column which was operated at atmospheric pressure and at a temperature below the triple point of $UF_6$. Two distillation cuts were taken from this fractionation column. The first overhead cut comprised essentially 0.1 mole $BrF_5$ and 99.9% of the tellurium originally present in the sample (as $TeF_6$). A second fraction distillate taken overhead comprised 49.9 moles of $BrF_5$ and 4.0 moles $UF_6$. This fraction was recycled for subsequent dissolution operations. The residue which was removed from the bottom of the fractionation column comprised 46 moles $UF_6$ dissolved in 50 moles $BrF_3$. This residue was introduced into the product fractionation column. The product fraction distilled from this column comprised 42 moles $UF_6$ containing less than 0.01 mole $BrF_5$, less than 0.01 mole $BrF_3$, and less than 0.1% of the original tellurium (as $TeF_6$). The residue from this product fractionation column, consisting of 50 moles $BrF_3$ and 4 moles $UF_6$, was recycled to the dissolving step.

While the process has been described primarily as applied to the processing of neutron-irradiated uranium it is equally well suited for treating uranium-containing ores or any uranium-containing intermediate products obtained in the processing of ores including waste materials. Thus, the so-called ore concentrates obtained by ore dressing procedures have been successfully subjected to the process of this invention. Likewise, scrap metal containing uranium, magnesium fluoride slag obtained in the reduction of uranium tetrafluoride with magnesium, and uranium tetrafluoride-containing materials have been found suitable starting materials for processing according to this invention.

The process can be applied to materials containing the uranium in relatively dilute form, such as to the above-mentioned ore concentrates; however, it has been found advantageous in such instances slightly to modify the process. It was found that a prefluorination step with hydrogen fluoride at about 600° C. for the conversion of the anions other than uranium to their fluorides and of the uranium to the tetrafluoride brought about a considerable saving in the comparatively expensive bromine trifluoride; a second fluorination step with bromine trifluoride according to this invention is subsequently used to convert the uranium tetrafluoride to the hexafluoride. The bromine trifluoride preferably contains a small quantity of an acid ansolvide which is a substance capable of producing fluorine system cations in said solvent. An acid ansolvide yields, either by direct dissociation or by interaction with the solvent, in this case with bromine trifluoride, the cation characteristic of the solvent. $BrF_2^+$, for instance, is a cation formed by dissociation of and characteristic to bromine trifluoride. Acid ansolvides especially well suitable for the process of this invention are antimony pentafluoride, niobium pentafluoride and tin tetrafluoride; a quantity of about 5 mole percent in the mixture is optimal.

In the following example a few runs are described which were carried out with such intermediate uranium ore materials.

EXAMPLE III

Various ore products were heated overnight at 400° C. to obtain materials of a uniform, low moisture content. A mixture of bromine trifluoride and antimony fluoride, the latter present in the mixture in a concentration of 5 mole percent, was added to the ore material. Heating was not necessary since the reaction with the bromine trifluoride is exothermic. The uranium hexafluoride formed was removed by distillation and the residue analysed for its uranium content. In the following Table V the data and results of these runs are summarized.

For run No. 2 the two-step procedure was applied, the first step consisting of treatment with hydrogen fluoride at 600° C. and the second step of treatment with the bromine trifluoride-antimony pentafluoride mixture.

TABLE V

| U-material | Composition, Percent | | | | | | Run No. | Process Details | U retained in ore material after treatment with BrF₃—SbF₅, percent of orig. content | BrF₃ consumption expressed as cc.F₂ (STP)/g. U |
|---|---|---|---|---|---|---|---|---|---|---|
| | H₂O | U₃O₈ | PbO | SiO₂ | SO₄ | Misc. | | | | |
| Rand ore concentrate | | 70.7 | | 2.65 | 2.90 | 1.14 NO₃⁻, 1.22 Fe, 2.80 CaO, 1.0 Al₂O₃, 2.82 NH₃. | 1 | Without previous hydrofluorination. | 0.07 | 419 |
| | | | | | | | 2 | After fluorination with HF at 600° C. | 0.10 | 138 |
| Precipitate obtained as intermediate product during ore processing. | 25.58 | 33.58 | 0.029 | 7.5 | 7.06 | 0.45 V, 0.01 B, 2.9 Fe, 0.21 MoO₃, 1.13 CaO. | 3 | Without previous hydrofluorination. | 0.55 | 552 |
| Do | 1.35 | 21.11 | 0.02 | 5.84 | 29.07 | 0.23 V, 0.0025 B, 1.3 Fe. | 4 | ___do___ | 0.81 | 767 |

This table shows that in all cases a good uranium recovery was obtained and that by the prefluorination with hydrogen fluoride the process can be made more economical since a smaller quantity of the relatively expensive bromine trifluoride is then required.

In another instance a magnesium fluoride slag derived from the so-called bomb process, in which uranium tetrafluoride is reduced to the metal with magnesium, was reacted with bromine trifluoride. The slag had been finely disintegrated prior to fluorination. A yield of more than 90% of the total uranium present in the slag was obtained in the form of uranium hexafluoride.

It is to be understood that the foregoing examples are merely illustrative of the present invention and are in no way to be construed as limitations thereon. It will be apparent to those skilled in the art that the general procedure set out in the above description is susceptible of numerous modifications without departing from the spirit of the present invention.

This application is a continuation-in-part of our co-pending application Serial No. 358,984, filed on June 1, 1953, now abandoned.

What is claimed is:

1. A method of recovering uranium from uranium-containing material, comprising adding bromine trifluoride to said material, adding a substance selected from the group consisting of bromine, antimony pentafluoride, niobium pentafluoride and tin tetrafluoride, heating the mixture thus obtained to a temperature of from 100 to 160° C. whereby uranium hexafluoride, bromine and bromine monofluoride are formed and volatilized, and condensing the uranium hexafluoride.

2. The method of claim 1 wherein uranium is present in metallic form and the substance is bromine.

3. The process of claim 1 wherein the uranium-containing material contains the uranium in a diluted form and the material is contacted with hydrogen fluoride, prior to the addition of bromine trifluoride, whereby uranium tetrafluoride is formed.

4. A method of separating uranium from plutonium present in a uranium-plutonium-containing aggregate, comprising adding bromine trifluoride to said aggregate, furthermore adding a substance selected from the group consisting of bromine, antimony pentafluoride, niobium pentafluoride and tin tetrafluoride to said aggregate, heating the mixture thus obtained to a temperature of from 100 to 160° C. whereby uranium hexafluoride, bromine, and bromine monofluoride are formed and volatilized away from plutonium tetrafluoride formed, and condensing the uranium hexafluoride.

5. The process of claim 4 wherein said substance is bromine and wherein it is present in an amount of about 10 mole percent of the bromine trifluoride.

6. The process of claim 4 wherein the temperature is approximately 130° C.

7. The process of claim 5 wherein fluorine is added to the mixture and the bromine and bromine monofluoride, as they are formed, are converted to bromine trifluoride.

8. The process of claim 5 wherein the bromine and bromine monofluoride are volatilized as they are formed by distillation prior to the volatilization of the uranium hexafluoride.

9. The process of claim 5 wherein aluminum fluoride is added to the mixture as a carrier for the plutonium tetrafluoride formed.

10. A method of separating uranium from uranium-, plutonium-, and fission-products-containing materials, comprising adding bromine trifluoride plus 10 mole per cent of bromine to said materials, adding chlorine trifluoride to the mixture thus obtained, slowly heating the mixture to a temperature of below 56° C. whereby fission product fluorides volatilize, raising the temperature to between 100 and 160° C. whereby uranium hexafluoride distills away from plutonium tetrafluoride formed.

11. A method of recovering uranium from uranium-containing material, comprising adding to the uranium-containing material bromine trifluoride and a substance selected from the group consisting of bromine, antimony pentafluoride, niobium pentafluoride, tin tetrafluoride, and mixtures thereof whereby uranium hexafluoride is formed.

12. The method of dissolving uranium which comprises adding to a bromine trifluoride solvent a member of the group consisting of bromine, antimony pentafluoride, niobium pentafluoride, tin tetrafluoride and mixtures thereof, and treating uranium with the resultant solution.

13. The method of dissolving uranium which comprises adding bromine to bromine trifluoride in quantity sufficient to provide a mixture of bromine trifluoride and approximately 10 mole percent bromine, and contacting uranium with the resultant mixture.

14. The method of dissolving a uranium mass containing as a contaminant plutonium whereby not more than about 0.23 percent of volatile plutonium compounds are formed, which comprises treating said uranium mass with bromine trifluoride while continuously eliminating the volatile reaction side products comprising bromine and the lower bromine fluorides from the reaction zone.

15. The process of claim 14 wherein the reaction is carried out at a temperature of 100-160° C.

16. The process of claim 14 wherein the reaction is carried out at a temperature of approximately 130° C.

17. The process of claim 14 wherein the reaction side products are eliminated from the reaction zone by reacting said side products with fluorine.

18. The process of claim 14 wherein the side products are eliminated from the reaction zone by distillation of said side products.

19. The process of claim 14 wherein the side products are eliminated from the reaction zone by sparging the reaction mixture with an inert gas.

20. The method of recovering substantially decontaminated uranium from neutron-irradiated uranium which comprises dissolving said uranium in a bromine trifluoride solvent while passing fluorine through said solvent whereby uranium hexafluoride, non-volatile plutonium fluoride, fission product fluorides, and bromine pentafluoride are formed, distilling the uranium hexafluoride, fluorine, bromine trifluoride, bromine pentafluoride and fission product fluorides more volatile than bromine trifluoride from the non-volatile plutonium fluoride and less volatile fission product fluorides, condensing said distillate, then distilling said condensate at a temperature below the distillation temperature of uranium hexafluoride whereby the fission product fluorides more volatile than uranium hexafluoride are separated from a residue comprising a uranium hexafluoride dissolved in bromine trifluoride, and then distilling the uranium hexafluoride from said residue and separately collecting the uranium hexafluoride thus distilled.

21. The process of claim 20 wherein aluminum trifluoride is present in the reaction zone during the dissolution of the neutron-irradiated uranium to provide an inert carrier for the non-volatile plutonium fluoride formed.

22. The process of recovering uranium substantially free of fission products and plutonium from a mixture of uranium, fission products and plutonium which comprises dissolving said mixture in a bromine trifluoride solvent at a temperature of approximately 130° C. while continuously removing from the reaction zone the bromine and bromine monofluoride formed, then distilling all constituents of the reaction mixture more volatile than bromine trifluoride and a substantial portion of the bromine trifluoride from the reaction mixture thus separating the volatile uranium hexafluoride from the nonvolatile plutonium compounds, condensing said distillate, distilling said condensate at a temperature and pressure just below that at which uranium hexafluoride is distilled whereby the fission product fluorides more volatile than uranium hexafluoride are separated from the residue, and then distilling and separately collecting the uranium hexafluoride from the residue.

23. The process of claim 22 wherein the volatile bromine and bromine monofluoride removed from the reaction zone are regenerated to bromine trifluoride with chlorine trifluoride.

24. The process of claim 22 wherein the bromine and bromine monofluoride removed from the reaction zone are regenerated to bromine trifluoride with fluorine.

25. The process of claim 22 wherein the bromine and bromine monofluoride removed from the reaction zone are regenerated to bromine trifluoride with bromine pentafluoride.

References Cited in the file of this patent

Emeleus: Journal Chemical Society (London), part I, 1950, pages 164–168.